(12) United States Patent
Zhou et al.

(10) Patent No.: US 12,444,782 B2
(45) Date of Patent: Oct. 14, 2025

(54) LIQUID COOLING DEVICE AND BATTERY PACK

(71) Applicant: CALB Co., Ltd., Jiangsu (CN)

(72) Inventors: Pengfei Zhou, Changzhou (CN); Tinglu Yan, Changzhou (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 614 days.

(21) Appl. No.: 17/877,826

(22) Filed: Jul. 29, 2022

(65) Prior Publication Data

US 2023/0335819 A1    Oct. 19, 2023

(30) Foreign Application Priority Data

Apr. 15, 2022 (CN) .......................... 202210400100.8

(51) Int. Cl.
| | |
|---|---|
| *H01M 10/613* | (2014.01) |
| *F28F 1/02* | (2006.01) |
| *H01M 10/643* | (2014.01) |
| *H01M 10/653* | (2014.01) |
| *H01M 10/6552* | (2014.01) |
| *H01M 10/6557* | (2014.01) |
| *H01M 10/6568* | (2014.01) |
| *H01M 50/213* | (2021.01) |

(52) U.S. Cl.
CPC .......... *H01M 10/613* (2015.04); *F28F 1/022* (2013.01); *H01M 10/643* (2015.04); *H01M 10/653* (2015.04); *H01M 10/6552* (2015.04); *H01M 10/6557* (2015.04); *H01M 10/6568* (2015.04); *H01M 50/213* (2021.01); *F28F 2210/10* (2013.01)

(58) Field of Classification Search
None
See application file for complete search history.

(56) References Cited

U.S. PATENT DOCUMENTS

2007/0262746 A1* 11/2007 Kang .................. H01M 50/569
                                                               901/50
2017/0162922 A1* 6/2017 Sumpf, Jr. ........ H01M 10/6557
(Continued)

FOREIGN PATENT DOCUMENTS

| CN | 108832222 | | 11/2018 |
|---|---|---|---|
| CN | 110739502 A | * | 1/2020 |

(Continued)

OTHER PUBLICATIONS

Machine English translation of CN-110739502-A from Espacenet originally published to Cheng Jan. 31, 2020 (Year: 2020).*

(Continued)

*Primary Examiner* — Ula C Ruddock
*Assistant Examiner* — Mary Grace Byram
(74) *Attorney, Agent, or Firm* — JCIP GLOBAL INC.

(57) ABSTRACT

A liquid cooling device and a battery pack are provided. The liquid cooling device includes a plurality of liquid cooling units connected in parallel. Each of the liquid cooling units includes at least one liquid cooling pipe, the liquid cooling pipe in at least one of the liquid cooling units is multiple in number, and the plurality of the liquid cooling pipes are connected in series. An accommodation space for accommodating batteries is formed between adjacent two of the liquid cooling pipes.

10 Claims, 3 Drawing Sheets

(56) References Cited

U.S. PATENT DOCUMENTS

| | | | |
|---|---|---|---|
| 2018/0062226 A1* | 3/2018 | Raiser | H01M 10/613 |
| 2022/0278347 A1* | 9/2022 | Harvey | H01M 8/249 |
| 2023/0238607 A1* | 7/2023 | Zhang | H01M 50/213 |
| | | | 429/120 |

FOREIGN PATENT DOCUMENTS

| | | |
|---|---|---|
| EP | 3968440 | 3/2022 |
| GB | 2586658 | 3/2021 |

OTHER PUBLICATIONS

"Search Report of Europe Counterpart Application", issued on Sep. 6, 2023, p. 1-p. 9.

\* cited by examiner

LIQUID COOLING DEVICE AND BATTERY PACK

CROSS-REFERENCE TO RELATED APPLICATION

This application claims the priority benefit of China application serial no. 202210400100.8, filed on Apr. 15, 2022. The entirety of the above-mentioned patent application is hereby incorporated by reference herein and made a part of this specification.

BACKGROUND

Technical Field

The present disclosure relates to the technical field of batteries, and in particular, to a liquid cooling device and a battery pack.

Description of Related Art

In the related art, a liquid cooling device is utilized to liquid-cool the battery. When the liquid cooling device liquid-cools the battery in parallel manner, more joints of liquid cooling pipes are required for separating flows, which not only increases the cost, but also tends to cause liquid leakage, resulting in a safety risk to the battery pack. When the liquid cooling device liquid-cools the battery in series manner, although the use of liquid-cooling pipe joints is reduced, the temperature difference between the battery at the initial position and the battery at the final position is larger due to the longer liquid cooling path. As a result, the overall service life and circulation performance of the battery pack are affected.

SUMMARY

The disclosure provides a liquid cooling device and a battery pack.

According to a first aspect of the present disclosure, a liquid cooling device is provided. The liquid cooling device includes a plurality of liquid cooling units connected in parallel. Each of the liquid cooling units includes at least one liquid cooling pipe, the liquid cooling pipe in at least one of the liquid cooling units is multiple in number, and the plurality of the liquid cooling pipes are connected in series. An accommodation space for accommodating batteries is formed between adjacent two of the liquid cooling pipes.

According to a second aspect of the present disclosure, a battery pack is provided. The battery pack includes batteries and the liquid cooling device described above, and the batteries are arranged in the accommodation space.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
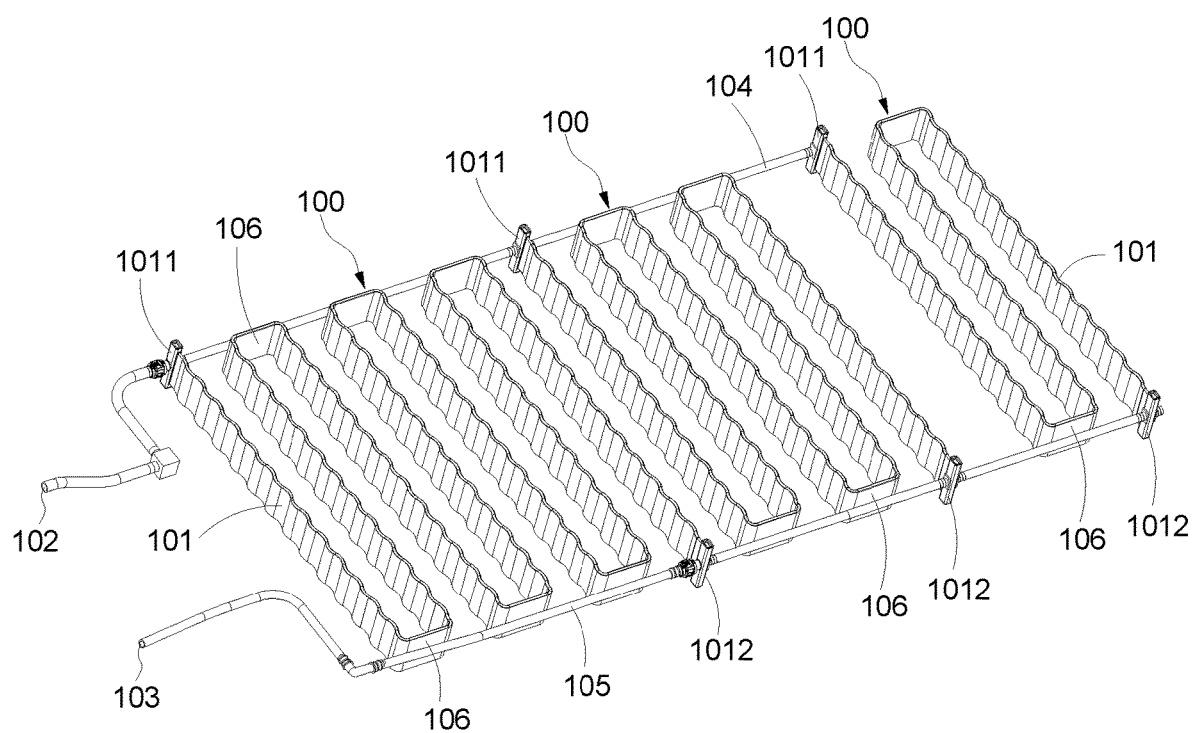
FIG. 1 is a schematic structural view of a liquid cooling device provided in this embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Referring to FIG. 1 to FIG. 5, this embodiment provides a liquid cooling device. The liquid cooling device includes a plurality of liquid cooling units 100 connected in parallel, and each of the liquid cooling units 100 includes at least one liquid cooling pipe 101. The liquid cooling pipe 101 in at least one of the liquid cooling units 100 is multiple in number, and the plurality of the liquid cooling pipes 101 are connected in series. An accommodation space for accommodating batteries is formed between adjacent two of the liquid cooling pipes 101.

The liquid cooling device provided by the present embodiment includes a plurality of liquid cooling units 100 connected in parallel. When the plurality of liquid cooling units 100 connected in parallel liquid-cool the batteries in the accommodation space, the liquid cooling path is shorter, which reduces the temperature difference between the batteries inside the battery pack, and improves the temperature consistency of the batteries inside the battery pack. In the meantime, since at least one of the liquid cooling units 100 includes a plurality of liquid cooling pipes 101 connected in series, the number of joints for liquid cooling pipes 101 may be reduced, the production costs may be decreased and safety may be improved.

Figure 3:
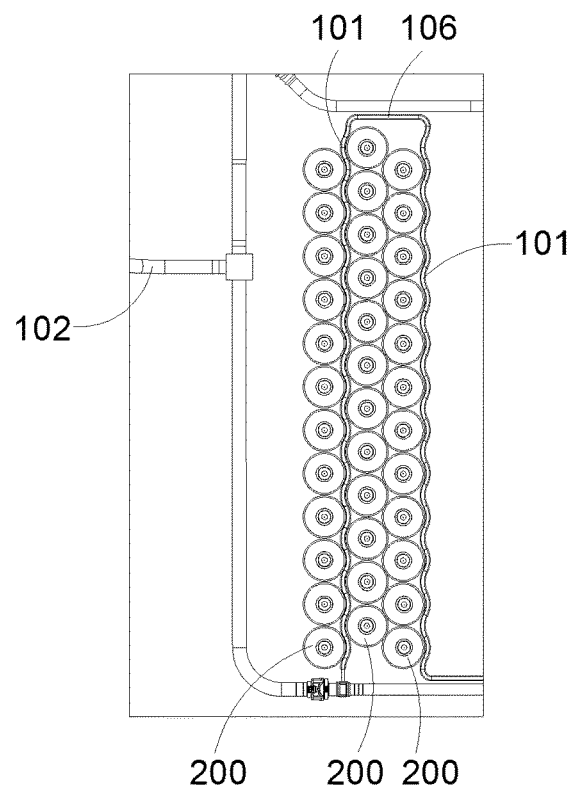
FIG. 3 is a partial schematic view of the liquid cooling device provided in this embodiment cooperating with batteries.

Specifically, one row of batteries or two rows of batteries may be placed in the accommodation space formed between two adjacent liquid cooling pipes 101. When a row of batteries is placed in the accommodation space formed between two adjacent liquid cooling pipes 101, the two adjacent liquid cooling pipes 101 are located on both sides of the same row of batteries respectively. Under the circumstances, the two adjacent liquid cooling pipes 101 can liquid-cool the same row of batteries. Referring to FIG. 3, when two rows of batteries are placed in the accommodation space formed between two adjacent liquid cooling pipes 101, the two adjacent liquid cooling pipes 101 respectively perform liquid-cooling on corresponding rows of batteries adjacent thereto.

Exemplarily, the liquid cooling device includes a plurality of liquid cooling units 100 connected in parallel, the number of all the liquid cooling pipes 101 in the plurality of liquid cooling units 100 is multiple, and the plurality of liquid cooling pipes 101 in each liquid cooling unit 100 are connected in series. The plurality of liquid cooling pipes 101 are arranged at intervals, so that the accommodation space for accommodating batteries can be formed between two adjacent liquid cooling pipes 101. The number of liquid cooling pipes 101 in each liquid cooling unit 100 may be the same or different.

In an embodiment, the plurality of liquid cooling pipes 101 are connected in series through connecting pipe segments 106, and an included angle between each of the connecting pipe segments 106 and a corresponding one of the liquid cooling pipes 101 is greater than 0° and smaller than 180°.

Specifically, the plurality of liquid cooling pipes 101 in the same liquid cooling unit 100 are connected in series through the connecting pipe segments 106. Exemplarily, as shown in FIG. 1, three liquid cooling pipes 101 are disposed in the liquid cooling unit 100, and two adjacent liquid cooling pipes 101 are connected in series through one connecting pipe segment 106. The connecting pipe segments 106 are in the shape of flat pipe. The connecting pipe segment 106 and the two adjacent liquid cooling pipes 101 may be fixed by welding or integrally formed as one piece. An included angle between the connecting pipe segment 106 and the liquid cooling pipe 101 is greater than 0° and smaller than 180°, ensuring that the two adjacent liquid cooling pipes 101 connected in series and the connecting pipe segment 106 connecting the two liquid cooling pipes 101 form the accommodation space, so as to avoid that multiple liquid cooling pipes 101 and connecting pipe segments 106 are located on the same side of the batteries.

In an embodiment, the plurality of liquid cooling pipes 101 are arranged in parallel at intervals.

Exemplarily, the liquid cooling pipe 101 is a flat pipe, and the multiple liquid cooling pipes 101 are arranged in parallel at intervals, that is, the extending directions of the multiple liquid cooling pipes 101 are parallel, or it can also be interpreted that the plate surfaces of the multiple liquid cooling pipes 101 are parallel. The plate surface of the liquid cooling pipe 101 refers to the surface, having the largest area, of the liquid cooling pipe 101. In an embodiment, as shown in FIG. 1, the liquid cooling device is provided with a liquid inlet 102, the plurality of liquid cooling units 100 are all communicated with the liquid inlet 102, and the plurality of liquid cooling units 100 are arranged at intervals in a direction away from the liquid inlet 102. The number of liquid cooling pipes 101 in the liquid cooling unit 100 adjacent to the liquid inlet 102 is greater than the number of liquid cooling pipes 101 in the liquid cooling unit 100 away from the liquid inlet 102.

Exemplarily, the liquid cooling device includes three liquid cooling units 100 connected in parallel, all of the three liquid cooling units 100 are in communication with the liquid inlet 102, and the three liquid cooling units 100 are arranged at intervals in the direction away from the liquid inlet 102. The liquid cooling pipes 101 in each liquid cooling unit 100 are also arranged in parallel at intervals in the direction away from the liquid inlet 102. As shown in FIG. 1, in the sequence from a position adjacent to the liquid inlet 102 to a position away from the liquid inlet 102, the number of liquid cooling pipes 101 in the three liquid cooling units 100 gradually decreases.

Specifically, when the liquid cooling medium just flows from the liquid inlet 102 into the liquid cooling unit 100 closest to the liquid inlet 102, because the pressure difference is not large, the flow resistance is lower, and the flow rate of the liquid cooling medium is larger. Therefore, more liquid cooling pipes 101 connected in series may be provided in the liquid cooling unit 100 closest to the liquid inlet 102. As the distance between the liquid cooling unit 100 and the liquid inlet 102 increases, the pressure drop decreases more, and the flow rate of the liquid cooling medium is gradually decreased as a result. Therefore, in order to ensure that the liquid cooling medium passes through all the liquid cooling units 100 smoothly, it is necessary to gradually reduce the number of the liquid cooling pipes 101 connected in series in the liquid cooling unit 100 to ensure the liquid cooling effect inside the battery pack, reduce the temperature difference between the batteries, and improve the temperature consistency of the batteries inside the battery pack.

In an embodiment, among the multiple liquid cooling units 100, the number of liquid cooling pipes 101 in n liquid cooling units 100 is multiple, and the multiple liquid cooling pipes 101 are connected in series. Specifically, n is a positive integer; and n is greater than or equal to 2 and smaller than or equal to the total number of liquid cooling units 100 in the liquid cooling device. Among the n liquid cooling units 100, the number of liquid cooling pipes 101 in the n−m+1$^{th}$ liquid cooling unit 100 is $a_{n-m+1}$, $a_{n-m+1}$=2m+1, m is a positive integer greater than or equal to 1 and smaller than or equal to n.

It should be noted that the first liquid cooling unit 100 refers to the liquid cooling unit 100 closest to the liquid inlet 102. Because the number of liquid cooling pipes 101 in the liquid cooling unit 100 close to the liquid inlet 102 is greater than the number of liquid cooling pipes 101 in the liquid cooling unit 100 away from the liquid inlet 102, the value of m decreases gradually in the sequence from the position adjacent to the liquid inlet 102 to the position away from the liquid inlet 102.

Exemplarily, n=3, that is to say, the liquid cooling device includes three liquid cooling units 100 that are connected in parallel, and the values of m are 3, 2, and 1 in sequence from the position adjacent to the liquid inlet 102 to the position away from the liquid inlet 102. Referring to FIG. 1, the number of the liquid cooling pipes 101 in the three liquid cooling units 100 are seven, five and three respectively in the sequence from the position adjacent to the liquid inlet 102 to the position away from the liquid inlet 102.

It should be noted that, when n≥3, the number of liquid cooling pipes 101 in a maximum of n−k liquid cooling units 100 may be the same as the number of liquid cooling pipes 101 in the $k^{th}$ liquid cooling unit 100. Specifically, k is a positive integer greater than or equal to 2 and smaller than n.

Exemplarily, the number of liquid cooling pipes 101 in the last liquid cooling unit 100 may be the same as the number of liquid cooling pipes 101 in the previous liquid cooling unit 100.

Figure 2:
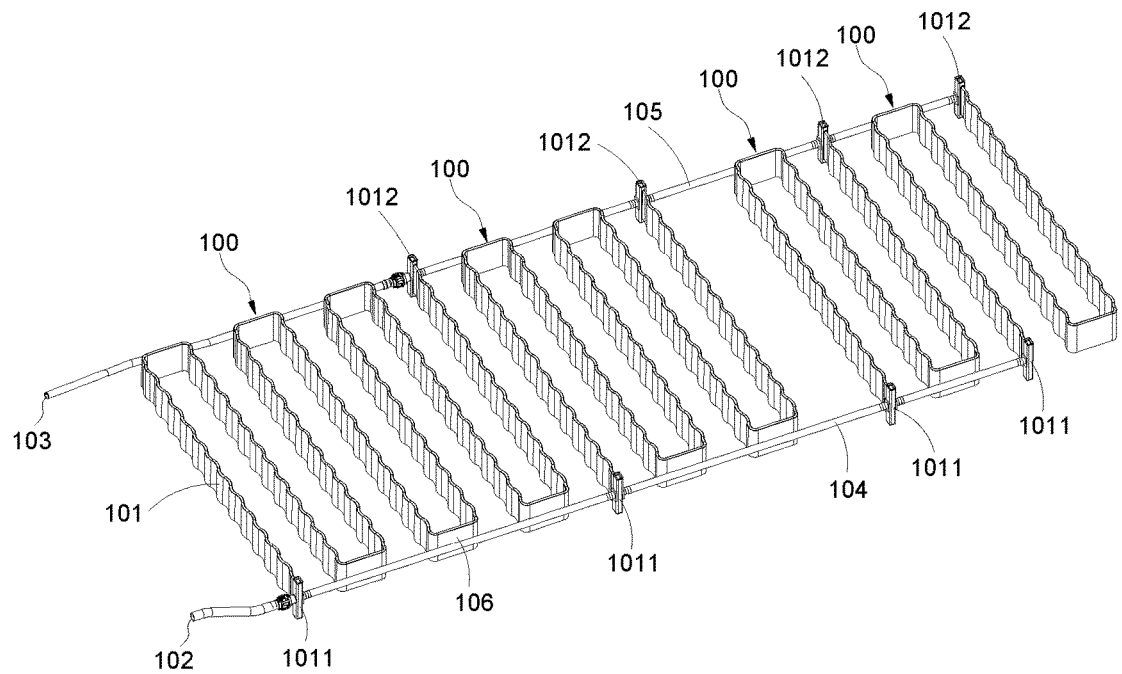
FIG. 2 is another schematic view of a liquid cooling device in this embodiment.

Exemplarily, n=4, the values of m are 3, 2, and 1 in sequence. Referring to FIG. 2, the liquid cooling device includes four liquid cooling units 100. The number of liquid cooling pipes 101 in each of the four liquid cooling units 100 is seven, five, three, and three, respectively in the sequence from the position adjacent to the liquid inlet 102 to the position away from the liquid inlet 102.

In some embodiments, referring to FIG. 3, the liquid cooling device is adopted for liquid cooling cylindrical batteries 200. The liquid cooling pipe 101 is a serpentine flat pipe, and the wavy lateral wall of the serpentine flat pipe may be adapted to the circumferential surfaces of the cylindrical batteries 200 to facilitate liquid cooling on the cylindrical batteries 200.

Referring to FIG. 3, the outer sides of the liquid cooling pipes 101 located on two sides of the liquid cooling device may also accommodate batteries. The two sides of the liquid cooling device refer respectively to one side closest to the liquid inlet 102 and the other side farthest from the liquid inlet 102. Taking the side closest to the liquid inlet 102 as an example, the outer side of the liquid cooling pipe 101 on this side refers to one side of the liquid cooling pipe 101 away from other liquid cooling pipes 101, that is, the side of the liquid cooling pipe 101 adjacent to the liquid inlet 102. The batteries may be placed in the accommodation space between the liquid cooling pipe 101 on this side and the liquid cooling pipe 101 adjacent thereto, and batteries may also be placed on the outer side of the liquid cooling pipe 101 on this side, so that the liquid cooling pipe 101 liquid-cools the batteries located on both sides of the liquid cooling pipe 101 simultaneously.

In an embodiment, the liquid cooling device further includes a liquid inlet pipe 104 and a liquid outlet pipe 105. The liquid cooling unit 100 is provided with an inlet and an outlet, the inlet is provided with a first pipe joint 1011, and the outlet is provided with a second pipe joint 1012. The first pipe joint 1011 communicates with the liquid inlet 102 of the liquid cooling device through the liquid inlet pipe 104, and the second pipe joint 1012 communicates with the liquid outlet 103 of the liquid cooling device through the liquid outlet pipe 105.

Referring to FIG. 1, the inlets of the three liquid cooling units 100 are all provided with first pipe joints 1011, and the outlets of the three liquid cooling units 100 are all provided with second pipe joints 1012. The first pipe joints 1011 of the three liquid cooling units 100 are communicated with the liquid inlet pipe 104, and the second pipe joints 1012 of the three liquid cooling units 100 are communicated with the liquid outlet pipe 105, so as to realize the parallel communication between the three liquid cooling units 100.

Specifically, the liquid cooling medium passes through the first pipe joints 1011 of the three liquid cooling units 100 from the liquid inlet 102 in sequence. After the liquid cooling medium enters the first pipe joint 1011 of the first liquid cooling unit 100, the liquid cooling medium passes through seven liquid cooling pipes 101 connected in series, and enters the liquid outlet pipe 105 from the second pipe joint 1012 of the first liquid cooling unit 100. After the liquid cooling medium enters the first pipe joint 1011 of the second liquid cooling unit 100, the liquid cooling medium passes through five liquid cooling pipes 101 connected in series, and enters the liquid outlet pipe 105 from the second pipe joint 1012 of the second liquid cooling unit 100. After the liquid cooling medium enters the first pipe joint 1011 of the third liquid cooling unit 100, the liquid cooling medium passes through three liquid cooling pipes 101 connected in series, and enters the liquid outlet pipe 105 from the second pipe joint 1012 of the third liquid cooling unit 100. Thereafter, the liquid cooling medium converges at the liquid outlet pipe 105. Exemplarily, the liquid cooling medium enters the liquid inlet pipe 104 again under the action of an external liquid cooling circulation system (e.g., a circulating pump), so as to realize the circulation of the liquid cooling medium, and to carry out continuous heat exchange for the batteries.

Referring to FIG. 1, the total number of liquid cooling pipes 101 in the three liquid cooling units 100 is fifteen, and the total number of first pipe joints 1011 and second pipe joints 1012 is six. However, the number of joints for liquid cooling pipe required for connecting fifteen liquid cooling pipes in parallel in the related art is thirty. Therefore, the production cost of the liquid cooling device provided in this embodiment is relatively low.

In the meantime, if fifteen liquid cooling pipes are connected in series to liquid-cool multiple rows of batteries by using the series connection method in the related art, the liquid cooling path is longer, which results in a larger temperature difference between the batteries at the initial position and the batteries in the final position, and affects the overall service life and circulation performance of the battery pack.

In the liquid cooling device provided in this embodiment, in order to ensure that the liquid cooling medium passes through all the liquid cooling units 100 smoothly, the number of the liquid cooling pipes 101 connected in series in the liquid cooling unit 100 is gradually reduced, so as to ensure the liquid cooling effect inside the battery pack, reduce the temperature difference between the batteries and improve the temperature consistency of the batteries inside the battery pack.

It should be noted that, the number of liquid cooling units 100 and the number of liquid cooling pipes 101 in each liquid cooling unit 100 are not limited to the above, and the quantity of them may be selected according to actual production and processing requirement.

In an embodiment, the number of liquid cooling pipes 101 in each liquid cooling unit 100 is an odd number.

Specifically, in the case where the number of liquid cooling pipes 101 in the liquid cooling unit 100 is multiple and the multiple liquid cooling pipes 101 are connected in series, the multiple liquid cooling pipes 101 are arranged in a serpentine shape, and the number of liquid cooling pipes 101 is an odd number. In this manner, the inlet and outlet of the liquid cooling unit 100 are located on both sides of the liquid cooling unit 100 respectively, thereby ensuring that the liquid inlet pipe 104 and the liquid outlet pipe 105 of the liquid cooling device may be respectively arranged on both sides of the liquid cooling unit 100. Through such design, it is possible to avoid the liquid inlet pipe 104 and the liquid outlet pipe 105 from interfering with each other. As a result, such configuration facilitates the assembly of multiple liquid cooling units 100 and improves the assembly efficiency.

In the case where the liquid cooling device includes an even number of liquid cooling units 100 connected in parallel, the total number of liquid cooling pipes 101 in all the liquid cooling units 100 in the liquid cooling device is an even number. In the case where the liquid cooling device includes an odd number of liquid cooling units 100 connected in parallel, the total number of liquid cooling pipes 101 in all liquid cooling units 100 in the liquid cooling device is an odd number.

It should be noted that the number of liquid cooling pipes 101 in the liquid cooling unit 100 may be one.

In an embodiment, a plurality of liquid cooling channels 1014 are disposed inside each of the liquid cooling pipes 101, and the plurality of liquid cooling channels 1014 are arranged at intervals along the height direction of the battery pack.

Figure 4:
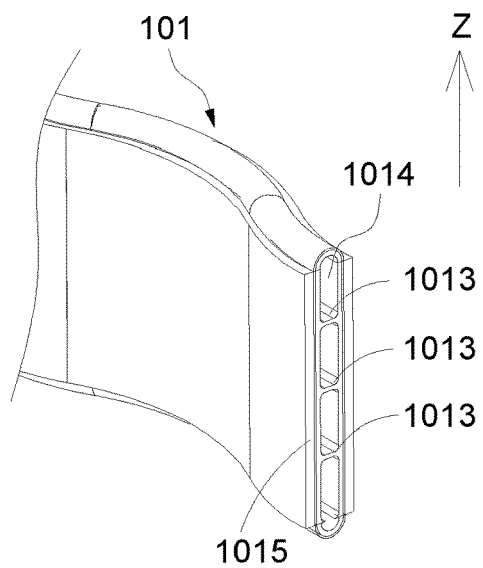
FIG. 4 is a partial schematic view of an internal structure of a liquid cooling pipe provided in this embodiment.

In some embodiments, a partition 1013 is provided in the liquid cooling pipe 101, and the extending direction of the partition 1013 is substantially the same as the extending direction of the liquid cooling pipe 101. The partition 1013 divides the inner cavity of the liquid cooling pipe 101 into a plurality of liquid cooling channels 1014. Exemplarily, as shown in FIG. 4, the number of partitions 1013 is three, the three partitions 1013 divide the inner cavity of the liquid cooling pipe 101 into four liquid cooling channels 1014, and the four liquid cooling channels 1014 are arranged at intervals along the height direction of the battery pack. This configuration may ensure a larger contact area between the liquid cooling medium and the batteries, and avoid the problem that the liquid cooling medium can only liquid-cool the bottom of the batteries under the action of gravity.

Referring to FIG. 4, the arrow direction Z indicates the height direction of the battery pack. When the liquid cooling pipe 101 liquid-cools a row of batteries in the battery pack, the multiple liquid cooling channels 1014 may liquid-cool different parts of the same battery, ensuring that each battery may be liquid-cooled uniformly.

In an embodiment, the inner wall of the liquid cooling channel 1014 is arc-shaped. In this configuration, the flow resistance of the liquid cooling medium may be reduced, and in the meantime, it is possible to alleviate the impact caused by the liquid cooling medium on the liquid cooling pipe 101, and the damage to the liquid cooling pipe 101 may be reduced.

In some embodiments, the two opposite plate surfaces of the partition 1013 are both arc-shaped surfaces, and the bending directions of the two arc-shaped surfaces are opposite to each other. That is, each arc-shaped surface is bent toward a direction adjacent to the other arc-shaped surface. In this way, the inner wall of each of the liquid cooling channels 1014 has a smooth transition arc-shaped surface, so that the flow resistance of the liquid cooling medium may be reduced, and in the meantime, it is possible to alleviate the impact caused by the liquid cooling medium on the liquid cooling pipe 101, and the damage to the liquid cooling pipe 101 may be reduced.

In an embodiment, as shown in FIG. 4, thermally conductive buffer pads 1015 are provided on the outer surfaces of the liquid cooling pipe 101.

In some embodiments, the liquid cooling pipe 101 is made of metal, and thermally conductive buffer pads 1015 are provided on the outer surfaces of the liquid cooling pipe 101.

The liquid cooling pipe 101 made of metal may improve the liquid cooling effect. By disposing thermally conductive buffer pads 1015 on the outer surfaces of the liquid cooling pipe 101, a buffering function may be performed between the liquid cooling pipe 101 and the batteries to avoid damage to the batteries on the premise of ensuring the liquid cooling effect.

Exemplarily, the thermally conductive buffer pad 1015 may adopt an existing thermally conductive silicone pad.

In an embodiment, an insulating layer is further provided between the outer surface of the liquid cooling pipe 101 and the thermally conductive buffer pad 1015 to ensure insulation between the liquid cooling pipe 101 and the batteries.

Figure 5:
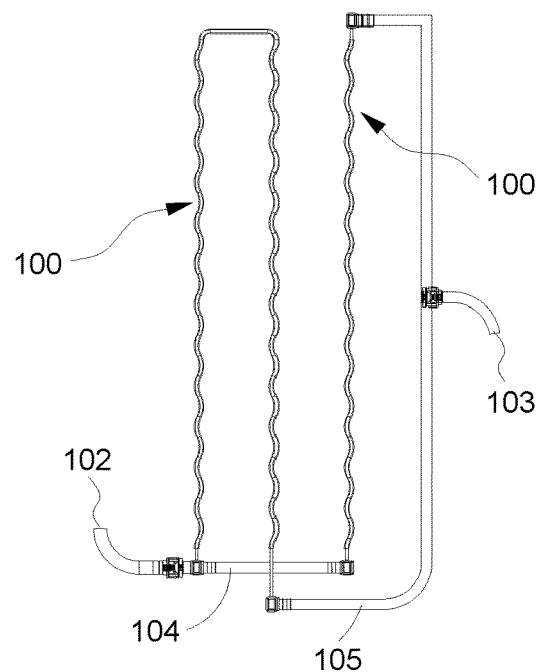
FIG. 5 is a schematic structural view of another modification of the liquid cooling device provided in this embodiment.

It should be noted that, among multiple liquid cooling units 100, the number of liquid cooling pipes 101 in one liquid cooling unit 100 may be one. Exemplarily, the liquid cooling device includes two liquid cooling units 100 connected in parallel, and the number of liquid cooling pipes 101 in one of the liquid cooling units 100 is one, the number of liquid cooling pipes 101 in the other one of the liquid cooling units 100 is two, and the two liquid cooling pipes 101 are connected in series. Referring to FIG. 5, FIG. 5 is a top view of the liquid cooling device. In order to clearly show the connection relationship between each liquid cooling unit 100 and the liquid inlet pipe 104 and the liquid outlet pipe 105, the liquid inlet pipe 104 and the liquid outlet pipe 105 are shown in staggered manner. In practice, the liquid inlet pipe joint and the liquid outlet pipe joint may be used, the liquid inlet pipe joints may be connected to the liquid inlet ends of the liquid cooling pipes 101 on both sides shown in FIG. 5, and the liquid outlet pipe joint may be connected to the liquid outlet end of the liquid cooling pipe 101 in the middle shown in FIG. 5. Exemplarily, the liquid outlet pipe 105 is located above the liquid inlet pipe 104.

This embodiment further provides a battery pack, which includes batteries and the liquid cooling device provided in this embodiment, and the batteries are arranged in the accommodation spaces.

Since the battery pack provided in this embodiment adopts the liquid cooling device provided in this embodiment, which not only can improve the temperature consistency of batteries inside the battery pack, but also reduce the production cost and improve the safety of the battery pack.

Figure 6:
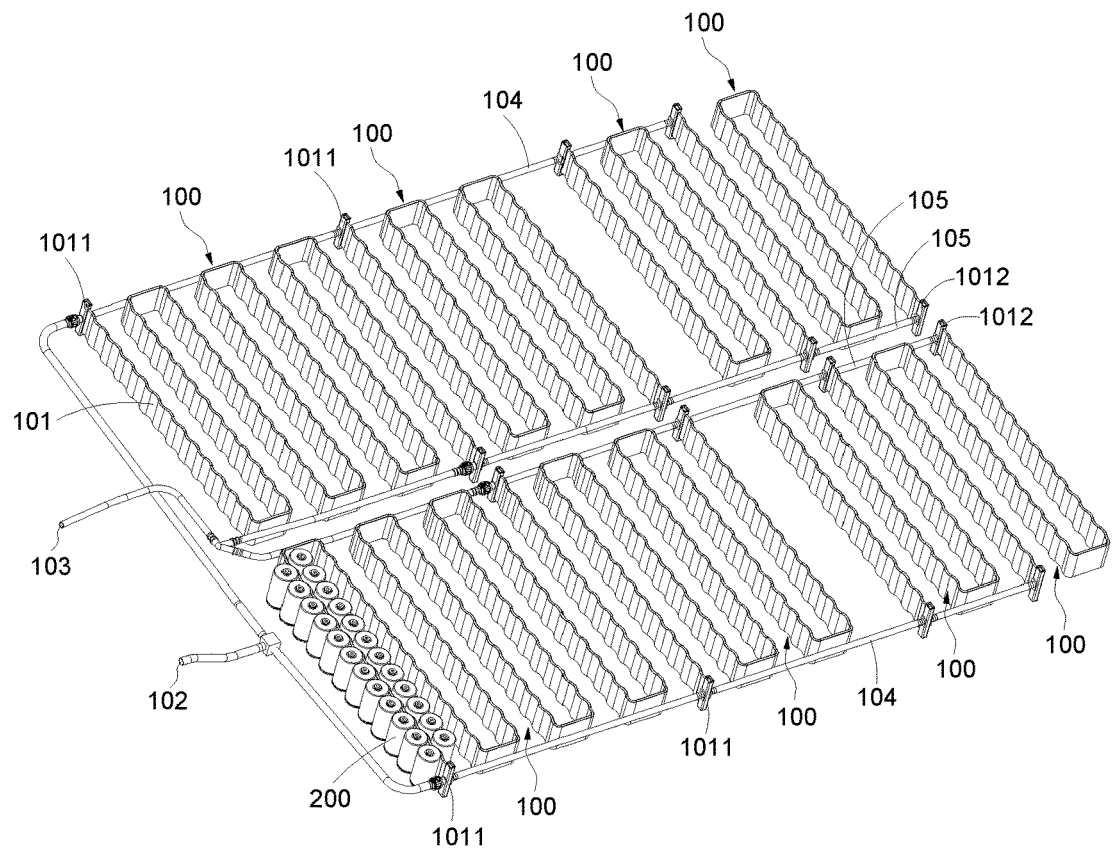
FIG. 6 is a schematic structural view of a battery pack provided in this embodiment.

Referring to FIG. 6, the battery pack provided in this embodiment includes two liquid cooling devices, and the two liquid cooling devices are symmetrically arranged inside the battery pack to ensure that the liquid inlet pipes 104 are respectively adjacent to both sides of the battery pack. The liquid outlet pipes 105 are concentrated in the middle position inside the battery pack, so that the internal space of the battery pack may be reasonably utilized, and the external dimension of the battery pack is reduced.

In an embodiment, a heat conducting structure is provided between the liquid cooling unit 100 and the battery.

Exemplarily, the heat conducting structure is a heat conducting structural adhesive, and the liquid cooling pipes 101 and the batteries are bonded and fixed by the heat conducting structural adhesive. In this manner, not only that the fixing strength of the liquid cooling pipes 101 and the batteries may be enhanced, but also a good heat exchange effect may be achieved.

It should be noted that the heat conductive structural adhesive is an existing art.

In an embodiment, each battery is a cylindrical battery 200. The height direction of the battery pack is the same as the axial direction of the cylindrical battery 200.

Exemplarily, a row of cylindrical batteries 200 are arranged on both sides of each liquid cooling pipe 101.

In an embodiment, the battery pack further includes a battery bracket, and the liquid cooling unit 100s and the batteries are located on the battery bracket. The battery bracket is made of an insulating material to ensure the safety of the battery pack.

For example, the battery bracket is made of plastic.

In an embodiment, the battery bracket is provided with a placement groove, and the batteries are fixedly arranged in the placement groove.

Exemplarily, the shape of the cross section of the placement groove is circular to adapt to the circumferential surface of the cylindrical battery 200. The upper surface of the battery bracket is provided with multiple rows of placement grooves, the multiple rows of placement grooves are arranged in parallel at intervals, and each row of placement grooves includes multiple placement grooves. Exemplarily, the placement grooves in two adjacent rows are in staggered arrangement. This arrangement makes full use of the battery bracket, so that more batteries may be placed on the battery batteries.

In an embodiment, each of the liquid cooling pipes 101 is a serpentine flat pipe, and the serpentine flat pipe is perpendicular to the bottom plate of the battery pack.

In some embodiments, the battery pack further includes a box body. The box body includes a bottom plate, the axis of each cylindrical battery 200 is perpendicular to the bottom plate, and the serpentine flat pipe is clamped and fixed between two adjacent rows of cylindrical batteries 200. The serpentine flat pipe is perpendicular to the bottom plate of the battery pack, which may ensure that both sides of the serpentine flat pipe are in contact with the circumferential surfaces of the cylindrical batteries 200, so as to ensure the liquid cooling effect on the batteries and improve the temperature consistency of batteries inside the battery pack.

The top of the serpentine flat pipe is lower than the top of the cylindrical battery 200. Such design may increase the contact area between the serpentine flat pipe and the circumferential surface of the cylindrical battery 200 on the basis of saving the space in the height direction of the battery pack to the greatest extent, and the liquid cooling efficiency may be improved.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A liquid cooling device, comprising a plurality of liquid cooling units connected in parallel, wherein each of the liquid cooling units comprises a plurality of liquid cooling pipes connected in series, and an accommodation space for accommodating batteries is formed between adjacent two of the plurality of liquid cooling pipes, wherein the liquid cooling device is provided with a liquid inlet, the plurality of liquid cooling units are all communicated with the liquid inlet, and the plurality of liquid cooling units are arranged at intervals along a direction away from the liquid inlet;

a number of the liquid cooling pipes in one of the liquid cooling units adjacent to the liquid inlet is greater than a number of the liquid cooling pipes in another one of the liquid cooling units away from the liquid inlet.

2. The liquid cooling device according to claim 1, wherein among the plurality of liquid cooling units, the number of the liquid cooling pipes in a set number of liquid cooling units is multiple, and the set number of liquid cooling units is n, wherein n is a positive integer; n is greater than or equal to 2, and n is smaller than or equal to a total number of the liquid cooling units in the liquid cooling device;

among the n liquid cooling units, the number of the liquid cooling pipes in one of the n liquid cooling units is $a_{n-m+1}$, wherein $a_{n-m+1}=2m+1$, and m is a positive integer greater than or equal to 1 and smaller than or equal to n.

3. The liquid cooling device according to claim 1, wherein the number of the liquid cooling pipes in each of the liquid cooling units is an odd number.

4. The liquid cooling device according to claim 1, wherein the plurality of liquid cooling pipes are connected in series through connecting pipe segments, and an included angle between each connecting pipe segments and a corresponding one of the liquid cooling pipes is greater than 0° and smaller than 180°.

5. The liquid cooling device according to claim 4, wherein the plurality of liquid cooling pipes are arranged in parallel at intervals.

6. The liquid cooling device according to claim 1, wherein a plurality of liquid cooling channels are disposed inside each of the liquid cooling pipes, and an inner wall of each of the liquid cooling channels is arc-shaped.

7. A battery pack, comprising batteries and the liquid cooling device as claimed in claim 1, wherein the batteries are arranged in the accommodation space.

8. The battery pack according to claim 7, wherein a heat conducting structure is provided between each of the liquid cooling units and the batteries.

9. The battery pack according to claim 7, wherein each battery is a cylindrical battery.

10. The battery pack according to claim 9, wherein each of the liquid cooling pipes is a serpentine flat pipe, and the serpentine flat pipe is perpendicular to a bottom plate of the battery pack.

\* \* \* \* \*